United States Patent Office 3,481,986
Patented Dec. 2, 1969

3,481,986
CHEMICAL PROCESS FOR THE PRODUCTION
OF CARBONYL ADDITION COMPOUNDS
David W. Hall, Englewood, and Charles H. De Puy,
Boulder, Colo., assignors to Marathon Oil Company, Findlay, Ohio, a corporation of Ohio
No Drawing. Filed Oct. 21, 1966, Ser. No. 588,301
Int. Cl. C07c 49/18
U.S. Cl. 260—593                                    16 Claims

ABSTRACT OF THE DISCLOSURE

The present invention comprises the interreaction of an alpha-halocarbonyl compound with an acceptor carbonyl compound in the conjoint presence of an aprotic solvent and transition metal.

---

The present invention relates to new methods for the production of carbonyl addition compounds by the interreaction of alpha-halocarbonyl compounds with acceptor carbonyl compounds, and in particular relates to such reactions carried out in the conjoint presence of an aprotic solvent and a transition metal.

It has been discovered that, according to the present invention, the above mentioned conjoint presence of aprotic solvent and transition metals enhance the reaction providing substantially increased yields, faster reaction rates and better economy as compared to reactions not run in the conjoint presence of the aforesaid metal and aprotic solvent. In addition, the processes of the present invention permit the use of relatively inexpensive metals as compared to those used in the classical Reformatsky reaction. Especially important, the present invention permits the reaction of a number of starting materials, e.g., alpha-halo-ketones which have been traditionally recognized by the literature as being inoperative as the alpha-halocarbonyl compound in the Reformatsky reaction.

By aprotic solvents, as used herein, is meant compositions which are liquid under the conditions of the reaction, which have high dielectric constant, (greater than about 15 at 25°), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogens capable of hydrogen bonding with, or transferring to, the other chemical moieties in the reaction mixture. The aprotic solvent can be composed of a mixture of liquids so long as the over-all liquid compositions meet the above criteria. Preferred among the aprotic solvents are N-alkylpyrrolidones, especially N-methylpyrrolidone; and N,N-dialkylformamides, especially dimethylformamide; N,N-dialkylamides, especially dimethylamides. The most preferred solvents for the reaction of the present invention are N-methylpyrrolidone (NMP) and dimethylformamide (DMF).

Preferably from 2 to about 100, and most preferably from about 4 to about 15 moles of the solvent will be present for each mole of alpha-halocarbonyl compound. Starting material alpha-halocarbonyl compounds will include alpha-halogenated esters, aldehydes, ketones and amides. While not narrowly critical, the number of carbon atoms in the alpha-halocarbonyl compounds will preferably be from 3 to about 25 for the ketones and esters; and from 2 to about 25 for the aldehydes and amides with alpha-halocarbonyl starting materials having not more than about 8 carbon atoms per molecule being most preferred. The preferred halo groups are chloro, bromo and iodo. In general, mono-alpha-halocarbonyls will be preferred. However, substitution by other halo groups, or other groups which do not interfere with the reactions of the present invention, while not especially desirable, can be tolerated.

Among the preferred alpha-halocarbonyl compounds of the present invention are aldehydes, e.g. chloroacetaldehyde, alpha-bromopropionaldehyde, 2-iodohexene-5-aldehyde, 5-bromo-2-chloro-2-phenylpentanal; ketones, e.g. chloroacetone, 3-chloro-12-fluoro - dodecanone - 2, and alpha-bromopropionphenone; ester, e.g. methyl iodoacetate, alpha-bromo - gamma - butyrolactone, methyl chloroacetate, and benzyl chloroacetate; amides, e.g. alpha-bromoacetamide, N-phenyl, N-methyl-alpha-iodopropionamide and N-cyclohexyl-alpha-chloroacetamide. "Alpha" as used herein, means located on the carbon atom adjacent to the carbonyl group.

"Acceptor carbonyl compound" as used herein, means a compound which contains at least one carbonyl function which may be either internal or external on the carbon chain. The acceptor carbonyl compound may be substituted with other groups such as halides, phenyls, etc. so long as they do not undergo undesirable side reactions or interfere with the reactions of the present invention.

The acceptor carbonyl compounds should not contain groups with highly acidic hydrogen atoms such as hydroxy, carboxy, mercaptan, etc. In certain instances acceptor carbonyl compounds substituted with such acidic groups undergo the reactions of the present process, but yields are, in general, rather low. In fact, the acceptor carbonyl coreactant may be the same compound as the alpha-halocarbonyl compound discussed above. Preferred acceptor coreactants for the present invention are aldehydes, e.g. benzaldehyde, butrylaldehyde, and enanthaldehyde; ketone, e.g. acetophenone, acetone, benzophenone, 4-bromo-4'-(beta - iodoethyl) - desoxybenzoin; ester, e.g. methyl benzoate, phenyl propionate, and beta-iodoethyl/gamma-fluorobutyrate. The aforementioned alpha-halocarbonyl compounds are also preferred as acceptor carbonyl coreactants. The number of carbon atoms per molecule for the acceptor carbonyl coreactants will preferably be from 1 to about 25 with chain lengths of from about 2 to about 8 being more preferred.

It is preferred that the acceptor carbonyl compound of the present invention be present in an amount nearly stichiometric with the amount of alpha-halocarbonyl compound. That is, about one mole of acceptor carbonyl group in the acceptor carbonyl compound per mole of alpha-halocarbonyl compound will give the best results. The moles of acceptor carbonyl group in the acceptor carbonyl compound per mole of alpha-halocarbonyl compound may vary as widely as from 0.01 to 100. More preferred ratios are from 0.5 to 2.0. The exact ratio used will depend upon whether one desires to obtain most efficient utilization of the acceptor carbonyl compound or of the alpha-halocarbonyl compound. If the acceptor carbonyl compound and the alpha-halocarbonyl compound are of equal cost, then a ratio near one to one is preferred.

By transition metals as used herein, is meant the metals of Groups Ib, IIb, IIIb, IVb, Vb, VIb, VIIb and VIII of the periodic table.

Preferred among the transition metals for the purposes of the present invention are iron and zinc with iron being most preferred for economic reasons. It is preferred that the transition metal of the present invention be present in a granular, powdered, wire or ribbon form to make surface available for reaction. Other forms of metal will be operable, but lower yields may result. As the metal actually enters into the reaction of the present invention, at least a stoichiometric amount of metal must be present, and the preferred quantity of transition metal is from 0.5 to about 10.0 moles of transition metal per mole of alpha-halocarbonyl compound in the reaction mixture.

Most preferably there will be present from about 0.6 to about 2.0 moles of transition metal per mole of alpha-halocarbonyl compound, with the lower value being applicable in those reactions where the alpha-halocarbonyl compound is acting as its own acceptor carbonyl compound.

If desired, the transition metal and the alpha-halocarbonyl compound may be reacted together and then added to the acceptor carbonyl coreactant with the aprotic solvent being present in both steps. Alternatively the metal and the two coreactants may be simply added to the aprotic solvent and agitated as necessary.

While not narrowly critical, the temperature for the process of the present invention will generally vary from about 0 to about 350° C. with temperatures from about room temperature to about 250° C. being more preferred. Pressure is likewise not narrowly critical and may range from about 0.1 atmospheres absolute to over 10,000 atmospheres. Pressure should be sufficient to maintain at least a portion of the reaction mixture liquid. Pressures of from 1 to about 10 atmospheres absolute are most preferred.

The process of the present invention may be conducted on a batch or on a continuous basis with conventional apparatus e.g. a stirred reaction vessel with provision for the addition of reactants.

The major products of the present invention are transition metal alcoholate addition products which must be hydrolized to obtain the free carbonyl addition products. This hydrolysis is readily accomplished by merely adding water or, preferably, dilute mineral acid, to the product mixture and conventionally separating the products, e.g. by filtration or distillation. The resulting compounds will, in general, be alcoholic substituted carbonyl compounds. The hydrolized products will, in most cases, to some degree, dehydrate to form unsaturated carbonyl compounds as final co-products with the alcoholic carbonyl compounds.

When the coreactants and a transition metal are mixed as described above, valuable minor products arise via a novel Wurtz-type coupling of the alpha-halocarbonyl compounds. The proportion of these valuable minor products to the major products may be varied as desired by adjusting the proportions of coreactants and varying the reaction conditions.

For example, when acetophenone and chloroacetone are reacted in the presence of iron in an aprotic solvent according to the present invention, 2,5-hexanedione may be recovered from the reaction mixture either before or after the hydrolysis step of the product work-up is done. The 2,5-hexanedione arises via a Wurtz-type coupling of chloroacetone. Coupling of alpha-haloesters has been reported to occur in the classic Reformatsky reaction. However, the reported failure of alpha-haloketones to undergo anything other than enolization under the traditional Reformatsky conditions makes the Wurtz-type coupling of alpha-haloketones according to the present invention particularly unexpected.

The carbonyl addition compounds produced from the coreaction of acetophenone and chloroacetone with iron in an aprotic solvent are recovered after the hydrolysis step of the product work-up. Included among these carbonyl addition products is a major amount of a mixture of 4-phenyl-4-hydroxy-2-pentanone and 4-phenyl-3-pentene-2-one. A minor amount of a mixture of 5-chloro-4-methyl-4-hydroxy-2-pentanone and 5-chloro-4-methyl-3-pentent-2-one is also produced. These latter compounds arise as a result of the alpha-halocarbonyl compound, chloroacetone, acting to a slight extent as its own coreactant acceptor carbonyl compound.

The invention will be more fully understood by reference to the following examples which should be considered as being merely illustrative. The invention is susceptible to a wide variety of modifications and variations which will be obvious to those skilled in the art and all such obvious modifications and variations are intended to be included within the claims appended hereto.

The apparatus for the examples which follow consists of a 3-neck round bottom flask fitted with an upright chilled water condenser, thermometer, and Teflon paddle blade stirrer. This stirrer bearing is ground glass and is of the jacketed type so that cooling can be provided with chilled water. In most runs a device is attached to the upright condenser so that a dry nitrogen atmosphere can be maintained. In a few runs, the condenser outlet is simply attached to a drying tower filled with Drierite.

The general procedure is to heat a mixture of the carbonyl reagents with a transition metal powder in an aprotic solvent in the above described apparatus. When it appears that the reaction is complete, the mixture is filtered to collect unchanged transition metal. Conversions and yields are then determined by one of the following two methods:

(1) The filtrate is partially distilled under vacuum. The distillate is analyzed for by-products and unchanged starting materials. The distillation residue is treated with cold 10% $H_2SO_4$. The products are isolated by repeated ether extraction and condensation of the resulting ether solution. The crude products so obtained are generally distilled and characterized by infrared and nuclear magnetic resonance (NMR) spectroscopy, and by gas-liquid chromatographic analysis (GLC) when the appropriate pure compounds are available for use as standards.

(2) The same as (1) except that the crude products from ether extraction are stripped of ether and then analyzed only by gas-liquid chromatographic analysis. Procedure (2) is used only when a related run has been done and pure materials are available as GLC standards. In general, a carefully weighed amount of an inert component is added to an aliquot of the crude product so that the weights of the several components therein can be obtained directly from the peak areas of the GLC chromatogram (this is known as the internal standard method of GLC analysis).

Iron used in the experiments described herein is electrolytic reagent grade, 200 mesh. Zinc used is Fisher's certified reagent grade zinc dust. Both of these metals are used as received from the supplier, with no pretreatment being required.

EXAMPLE I

To the above described apparatus is charged chloroacetone (46.3 g., 0.5 mole) benzaldehyde (53.0 g.; 0.5 mole), NMP (202 g.) and iron (27.9 g.; 0.5 g.a.). The mixture is stirred under a nitrogen atmosphere at 120° C. for six hours. The mixture is cooled to room temperature and filtered. Iron powder (18.2 g.) is recovered. Thus, the conversion of iron is 34.8%. The filtrate is distilled under reduced pressure. GLC analysis of the distillate shows acetone (3.94 g.), chloroacetone (1.92 g.) and benzaldehyde (6.5 g.). Thus, the conversion of chloroacetone is 96%, and the conversion of benzaldehyde is 87.8%. The yield of acetone, based on chloroacetone charged, is 13.6%.

The very viscous distillation residue (207.8 g.) is mixed with ether (300 ml.) and cold 10 wt. percent $H_2SO_4$ (400 ml.). The mixture is stirred six hours at 5–10° C., and then 48 hours at room temperature. At this point most of the ether has evaporated. An additional 200 ml. of ether is added and the mixture transferred to a separatory funnel. Although severe emulsion conditions ensue, extraction (100 ml. portions) with ether finally lead to colorless ether extracts. The ether solution (about 1500 ml.) is dried over anhydrous $Na_2SO_4$, filtered and stripped of ether under reduced pressure. Crude product (49.2 g.) is obtained. Infrared analysis indicates the presence of 4-phenyl-4-hydroxy-2-butanone and 4-phenyl-3-butene-2-one (formed via elimination of water from 4-phenyl-4-hydroxy-2-butanone). GLC analysis shows this sample to be 70% 4-phenyl-3-butene-2-one, 20% 4-phenyl-4-hydroxy- 2-butanone and 10% unidentified materials. Thus, the yield of 4-phenyl-3-butene-2-one is 47.2%, and the yield of 4-phenyl-4-hydroxy-2-butanone is 12%.

This example illustrates the use of an alpha-haloketone in a Reformatsky-type reaction. The literature states that alpha-haloketones do not undergo a normal Reformatsky reaction, but, instead undergo undersirable side reactions such as enolization under the traditional Reformatsky conditions. [See J. E. Arens and D. A. Van Dorp, Rec. trav. chim.,65, pg. 729 (1946); and Chem Abstr. 41, 5442 g.].

EXAMPLE II

To the above described apparatus is charged chloroacetone (46.3 g.; 0.5 mole), iron powder (27.9 g.; ½ g. a.) and NMP (205 g.). The mixture is stirred for seven hours at 120° C. At this point the conversion of chloro acetone is 96%, and the conversion of iron is 45–50%. The mixture is filtered and partially distilled under reduced pressure. Analysis of the distillate shows small amounts of 2, 5-hexanedione, diacetone alcohol and mesityl oxide to be present. Acetone is formed in 34% yield. The distillation residue is hydrolyzed with 300 ml. of 10% H$_2$SO$_4$ during a period of 48 hours. The temperature is about 10° C. the first four hours, and then about 25° C. the rest of the time.

The hydrolysis mixture is extracted with either (4×100 ml.). The ether solution is dried over anhydrous Na$_2$SO$_4$, filtered and stirpped of ether under reduced pressure. The infrared pectrum of the crude material (wt. 5.3 g.) is closely analogous to that of diacetone alcohol, but GLC analysis shows the major component to be quite a bit higher boiling than diacetone alcohol. The crude product is distilled at 1–2 mm. Hg. A center cut collecting at 100° C. posseses an infrared spectrum very similar to that of the crude product. The only lower-boiling contaminant is 2, 5-hexanedione (6.2%), and there are numerous higher boiling contaminants (about 30%). Infrared and GLC analysis indicate that the major component is:

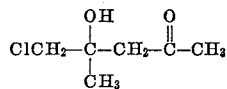

5-chloro-4-methyl-4-hydroxy-2-pentanone. This product apparently arises via addition of the organometallic reagent derived from chloroacetone and iron to another molecule of chloroacetone. Since this product is very water soluble, we conclude most of our product is still in the aqueous hydrolysis mixture. This aqueous phase is partially distilled under reduced pressure. The distillate (wt. 238.7 g.) is subjected to continous ether extraction for 24 hours. Work-up of the ether extract gives only a few tenths of a gram of organic materials. The aqueous distillation residue (wt. 187.1 g.) is filtered and subjected to continuous ether extraction for about 100 hours. The ether extract is dried over anhydrous Na$_2$SO$_4$, filtered and stripped of ether under reduced pressure. From this extract is obtained 23.7 g. of crude product. Infrared analysis indicates the major component is 5-chloro-4-methyl-4-hydroxy-2-pentanone. GLC analysis indicates the sample is 70% pure. Thus, all fractions of crude product combined lead to a yield of 18.5 g., or 49.3% of theory. The yield of the chloroacetone coupling product, 2,5-hexanedione, is 10%.

This run demonstrates that an alpha-halocarbonyl compound can itself react with the organiometallic reagent formed by the reaction of a transition metal and an alpha-halocarbonyl compound. The example further shows that under appropriate conditions, the alpha-halocarbonyl compound can give a Wurtz-type coupling product:

2, 5-hexanedione. No report of Wurtz-type coupling of an alpha-haloketone promoted by a transition metal was found in the literature.

EXAMPLE III

The previously described apparatus is modified for this run so that at the end of the run, material can be distilled directly from the reaction flask.

Chloroacetone (50 g.; 0.54 mole), iron powder (16.7 g.; 0.3 g.a.) and dimethylformamide (192 g.) are stirred at 93–96° C. for eighteen hours. At the end of this time, the pot temperature is raised to a maximum of 140° C. Distillate (14.6 g.) is collected at an overhead temperature ranging up to 120° C. GLC analysis of this distillate shows acetone is formed in a yield of 2%. Only a trace of chloroacetone is recovered.

The crude reaction mixture is cooled to room temperature and filtered. Iron (½ g.) is recovered. Thus, the conversion of iron is 97%. In this run, the observed stoichiometry is 0.29 g.a. iron required to convert 0.54 moles of chloroacetone. Total mechanical loss to this point is 3.6 g. out of 258.7 g. charged. It is believed this loss occurs via volatilization of acetone through the ground glass stirrer bushing. Therefore, the yield of acetone can actually be as high as 15.5%.

The filtered reaction mixture is stripped of about 130 g. of DMF by partial distillation under reduced pressure. GLC analysis of the distillate shows only DMF to be present. The dark, viscous residue is treated with 350 ml. of 10% H$_2$SO$_4$ at 5° C. The mixture is stirred for five hours at this temperature and for an additional eleven hours at room temperature.

The hydrolysis mixture is extracted with ether in a continuous extraction apparatus for sixteen hours. The ether extract is dried over anhydrous sodium sulfate, filtered and stripped of ether under reduced pressure. GLC analysis of the crude product (wt. 32.1 g.) shows 3.4 g. of 2,5-hexandione and 21.2 g. of 5-chloro-4-methyl-4-hydroxy-2-pentanone present. Minor amounts of diacetone alcohol and mesityl oxide are also detected. The yield of 2,5-hexanedione is 11%, and the yield of 5-chloro-4-methyl-4-hydroxy-2-pentanone is 52%.

Distillation of the crude product at reduced pressure gives in addition to the materials mentioned above, a small fraction which, according to infrared analysis, is mostly 5 - chloro - 4 - methyl-3-pentene-2-one (derived via elimination of water from the major product).

This experiment illustrates the utility of dimethylformamide in the present invention.

EXAMPLE IV

To the usual apparatus is added methyl chloroacetate (54.3 g.; 0.5 mole), benzaldehyde (53.1 g.; 0.5 mole), iron powder (28 g.; 0.5 g.a.) and N-methyl-2-pyrrolidone (220 g.). The mixture is stirred 3.5 hours at 120° C., cooled, and analyzed by gas chromatography. The conversion of methyl chloroacetate is about 8% and the conversion of benzaldehyde is 4% or less.

At this point sodium iodide (anhydrous reagent, 4 g.; 0.027 mole) is added and the mixture is stirred at 120° C. for an additional five hours. The mixture is cooled to room temperature and filtered. Iron (2.8 g.) is recovered (conversion is 90%). The filtrate is partially distilled under reduced pressure. Care is taken to ensure that the distillation pot temperature does not go above about 100–110° C. The 105 ml. of distillate collecting is analyzed (GLC) and found to contain methyl aceate (5 g.), methyl chloroacetate (0.3 g.), benzaldehyde (4.3 g.), methyl cinnamate (1.5 g.) and benzyl alcohol (0.5 g.).

The distillation residue is cooled in an ice bath and 10% H$_2$SO (400 ml.) is added portionwise over a period of one and one half hours. The mixture is stored overnight (no stirring) at about 5° C., and then stirred for three hours at room temperature. The hydrolysis mixture in extracted with ether (6×100 ml.), and then discarded. The ether solution is washed with water (100 ml.), 10% Na$_2$CO$_3$ solution (2×50 ml. and, finally, with water (100 ml.) again. It is then dried over anhydrous Na₂SO₄, filtered and stripped of ether at reduced pressure.

GLC analysis (xylene internal standard) shows the presence of benzaldehyde (0.5 g.), methyl cinnamate (8.5 g.), benzyl alcohol (1.8 g.) and methyl-β-phenylhydracrylate (46.2 g.).

Thus, on the basis of GLC analyses of crude products, the conversion of methyl chloracetate is 99.5% and the conversion of benzaldehyde is 91.2%. 4.2% of the benzaldehyde charged forms benzyl alcohol. Since benzyl alcohol presumably arises via the Cannizzaro reaction, another 4.2% of the benzaldehyde must be consumed to form benzoic acid. No attempt is made to detect benzoic acid. The yield of methyl cinnamate (dehydration product of methyl-β-phenylhydracrylate) is 12.3%. The yield of methyl-β-phenylhydracrylate is 51.3%.

The crude product is distilled through a spinning band apparatus at a pressure of 3 mm. Hg. A fraction collecting at 94° C. is found to be nearly pure methyl cinnamate. The yield is higher (15%) than calculated on the basis of GLC analyses of crude products. This is presumably because water is eliminated to some extent from methyl-β-phenylhydracrylate during the distillation. A fraction collecting at 120° C. is shown by infrared and GLC analyses to be nearly pure (better than 95%) methyl-β-phenyl-hydracrylate. The yield of the isolated product is 32%.

One of the forecuts fro mthis distillation collecting at 75–80° C. contains (GLC analysis) 80% of a material believed to be methyl-4-chloro-3-oxobutanoate

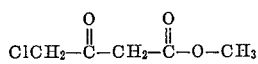

The material is shown by infrared analysis to contain a ketone group and an ester group. The product presumably arises via addition of the organometallic reagent formed by the reaction of the metal and methyl chloroacetate to the carbonyl function of methyl chloroacetate.

This example illustrates the applicability of the present process to an alpha-chloroester. The literature states [R. E. Miller and F. F. Nord, J. Org. Chem., 16, p. 738 (1951)] that alkali and alkaline earth salts do not act as catalysts for the reaction of alpha-haloesters in solvents traditionally used in the Reformatsky reaction. Thus, this example shows unexpectedly, that in the present invention, alkali metal salts do act as catalyst. This result now allows the use of the relatively inexpensive alpha-chloroesters in place of the previously required costly alpha-bromoesters without concomitant undesirable decrease in yields or increase in reaction times.

EXAMPLE V

To the usual apparatus is added chloroacetone (54.8 g.; 0.5 mole), iron powder (16.5 g.; 0.25 g.a.) and toluene (anhydrous; 300 g.). This mixture is stirred sixteen hours at 100° C. The mixture is then cooled to room temperature and analyzed by gas chromatography. The conversion of chloroacetone is less than 3%. Sodium iodide (5 g.) is added and the mixture stirred at 100° C. for an additional sixteen hours. The mixture is cooled and analyzed by gas chromatography. The conversion of chloroactone is less than 5%. No acetone or 2,5-hexanedione are produced. The mixture is filtered and the iron powder recovered and dried. No iron has reacted, and all the iron charged initially is recovered.

This experiment shows that iron is not effective when a solvent traditionally used in the classical Reformatsky reaction is employed. There are no reports in the literature in which iron has been shown to be effective in the Rerformatsky reaction. The literature [R. E. Miller and F. F. Nord, J. Org. Chem. 16, p. 728 ff. (1951)] states that copper or aluminum alone are not effective under conditions traditionally employed for the classical Reformatsky reaction.

EXAMPLE VI

To the usual apparatus are added methyl chloroacetate (54.3 g.; 0.5 mole), benzaldehyde (53.1 g.; 0.5 mole), sodium iodide (anhydrous; 4 g.; 0.027 mole) and zinc dust (32.7 g.; 0.5 g.a.). No pretreatment of the zinc is done. The mixture is stirred at 120° C. for five hours. The reaction is worked up according to procedure 2. The conversions of methyl chloroacetate and of zinc are both 100%. The conversion of benzaldehyde is 83%. The yield of methyl acetate is 16%. GLC analysis of the crude products shows methyl cinnamate to be formed in 32% yield and methyl-β-phenylhydracrylate to be formed in 20% yield.

This experiment shows that, under the conditions of the present invention the traditionally slightly reactive methyl chloroacetate reacts rapidly in the presence of zinc and sodium iodide to give good yields of the addition products with benzaldehyde. No pretreatment of the zinc is required. This is to be contrasted with the pretreatment required for zinc in the classical Reformatsky reaction [see Organic Synthesis Collective Colume 3, John Wiley & Sons, New York, N.Y., 1955, pages 408 and 409].

EXAMPLE VII

This is a repeat of the run described in Example I, except that p-chlorobenzaldehyde is used rather than benzaldehyde. The mixture is stirred at 120° C. for four and one-half hours. Work-up in the usual manner shows the following conversions of starting materials: iron (25.1%), chloroacetone (99%) and p-chlorobenzaldehyde (93.7%). The yield of acetone is 14.5%, based on chloroacetone charged. The yield of 4-(p-chlorophenyl)-3-butene-2-one is 35.0%, and the yield of 4-(p-chlorophenyl)-3-hydroxy-2-butanone is 5%.

EXAMPLE VIII

The reactants used in Example I, excluding the metal, are stirred at 120° C. in the usual apparatus. GLC analysis of the mixture before heating shows chloroacetone (15.0%), benzaldehyde (17.0%) and NMP (68%). After sixteen hours the mixture is found to be essentially unchanged, i.e., chloroacetone (14.4%), benzaldehyde (16.1%) and NMP (68.5%). There is 1.0% of a high boiling material present. This trace of high-boiler is shown not to be 4-phenyl-3-butene-2-one or 4-phenyl-4-hydroxy-2-butanone (GLC analysis).

This experiment demonstrates that the reactions observed in the other examples are, indeed, due to co-reaction of transition metal with an alpha-halocarbonyl compound.

EXAMPLE IX

To the previously described apparatus are added methyl chloroacetate (130 g.; 1.2 mole), ethyl formate (74.1 g.; 1.0 mole), zinc dust (130.8 g.; 2 g.a.) and NMP (306 g.). Ten g. of anhydrous lithium bromide is added as a catalyst. The mixture is stirred two hours at 30–50° C. and an additional 3.5 hours at 70–80° C. 20 g. of water is added, and the mixture is stirred at 70° C. for five more hours.

The mixture is cooled and then filtered to recover unchanged zinc. The filtrate is partially distilled at 30 mm. Hg and then the pressure is reduced to five mm. Hg and another fraction is collected. 32 g. of alpha-carbomethoxyacetaldehyde is collected together with ethanol and methanol. The distillation residue is cooled and diluted with 500 ml. of water. The mixture is stirred overnight and filtered. Impure methyl trimesate (2.1 g.) is collected and identified by infrared and NMR spectroscopy. The impurity in the methyl trimesate is chiefly the monocarboxylic acid resulting from hydrolysis of one of the ester functions.

This experiment demonstrates the broad synthetic utility of the present invention. Nearly any synthesis which has been done according to the traditional Reformatsky reaction can be done in a more economic fashion, with less expensive alpha-halocarbonyl compounds, less expensive metals, and higher reaction rates and higher product yields by means of the present invention. [See Organic Reactions, Volumn I, John Wiley and Sons, New York, N.Y., 1942, Chapter one, for a review of the Reformatsky reaction.]

What is claimed is:

1. The interreaction of an alpha-halocarbonyl compound selected from the group consisting of alpha-halogenated esters containing from 3 to about 25 carbon atoms, alpha-halogenated aldehydes containing from 2 to about 25 carbon atoms and alpha-halogenated ketones containing from 3 to about 25 carbon atoms in which the halogens are selected from the group consisting of chlorine, bromine, and iodine, and wherein alpha denotes located on the carbon atom adjacent the carbonyl group, with an acceptor carbonyl compound containing from 1 to about 25 carbon atoms and being selected from the group consisting of aldehydes, ketones, esters in the conjoint presence of an aprotic solvent which is liquid under the conditions of the reaction, has a dielectric constant greater than about 15 at 25° C., is dipolar so that one part of the molecule has a more positive electrical charge relative to the other parts of the molecule causing the molecule to act as a dipole, is sufficiently inert not to enter into deleterious side reactions to a significant degree under the reaction conditions, which does not possess hydrogen atoms capable of hydrogen bonding with or transferring to anions in solution in the reaction mixture or mixtures of such liquids, and iron, wherein there are present from 2 to about 100 moles of said aprotic solvent for each mole of alpha-halocarbonyl compound, and wherein there are present from 0.01 to 100 moles of acceptor carbonyl group in said acceptor carbonyl compound per mole of alpha-halocarbonyl compound and wheer there are present from 0.5 to about 10.0 moles of iron per mole of alpha-halocarbonyl compound, and wherein the reaction is conducted at a temperature of from about 0 to about 350° C.

2. The process of claim 1 wherein the alpha-halocarbonyl compound is selected from the group consisting of alpha-halogenated -aldehydes and -ketones.

3. The process of claim 1 wherein the aprotic solvents are selected from the group consisting of N-alkylpyrrolidones and N,N-dialkylformamides.

4. The process of claim 1 wherein the aprotic solvent comprises a major portion of N-alkylpyrrolidone.

5. The process of claim 1 wherein the aprotic solvent comprises a major portion of N,N-dialkylformamide.

6. The process of claim 1 wherein the aprotic solvent comprises a major portion of N-methylpyrrolidone.

7. The process of claim 1 wherein the aprotic solvent comprises a major portion of dimethylformamide.

8. The process of claim 3 wherein the acceptor carbonyl compound is selected from the group consisting of esters, aldehydes and ketones.

9. The process of claim 1 wherein the acceptor carbonyl compound is an ester.

10. The process of claim 1 wherein the acceptor carbonyl compound is an alpha-halo-aldehyde, -ester, or -ketone, either of which contains a chlorine, bromine, or iodine atom on the carbon atom adjacent the carbonyl group and contains up to about 25 carbon atoms.

11. The process of claim 1 wherein th eacceptor carbonyl compound is an aldehyde.

12. The process of claim 1 wherein the acceptor carbonyl compound is a ketone.

13. A process for coupling alpha-haloketones by Wurtz-type coupling in the conjoint presence of iron and an aprotic solvent.

14. The process of claim 13 wherein the alpha-haloketone is chloroacetone, and the aprotic solvent is N-methylpyrrolidone or dimethylformamide.

15. The process of claim 1 conducted in the presence of an alkali metal halide or alkaline earth metal halide.

16. The process of claim 2 conducted in the presence of an alkali metal halide or alkaline earth metal halide.

References Cited

UNITED STATES PATENTS

| | | | |
|---|---|---|---|
| 3,024,290 | 3/1962 | Henne | 260—653.3 |
| 3,287,425 | 11/1966 | Maynard | 260—653.8 |
| 3,371,120 | 2/1968 | Nowotny | 260—612 |

OTHER REFERENCES

Kim, Daehan Hwahak Howoejee 7 (3) 216–224 (1963).

Kim, Chem. Abstracts 62, 4047a (1965) citing Kim, Daehan Hwahak Howoejee 7 (3) 216–224 (1963).

Kravch et al., Organic Name Reactions, pp. 370–371 (1964), Wiley, New York, N.Y.

DANIEL D. HORWITZ, Primary Examiner

U.S. Cl. X.R.

260—590, 594, 476, 618, 473, 515, 488, 483, 475